US010044602B2

(12) United States Patent
Khakpour et al.

(10) Patent No.: US 10,044,602 B2
(45) Date of Patent: Aug. 7, 2018

(54) NETWORK FAILOVER AND LOOP DETECTION IN HIERARCHICAL NETWORKS

(71) Applicant: Verizon Digital Media Services Inc., Dulles, VA (US)

(72) Inventors: Amir Reza Khakpour, Santa Monica, CA (US); Robert J. Peters, Santa Monica, CA (US); Derek Shiell, Los Angeles, CA (US)

(73) Assignee: Verizon Digital Media Services Inc., Los Angeles, CA (US)

( * ) Notice: Subject to any disclaimer, the term of this patent is extended or adjusted under 35 U.S.C. 154(b) by 0 days.

(21) Appl. No.: 15/693,788

(22) Filed: Sep. 1, 2017

(65) Prior Publication Data

US 2017/0366447 A1    Dec. 21, 2017

Related U.S. Application Data (63) Continuation of application No. 14/860,287, filed on Sep. 21, 2015, now Pat. No. 9,755,949.

(51) Int. Cl.
*H04L 12/705* (2013.01)
*H04L 12/939* (2013.01)
*H04L 12/703* (2013.01)

(52) U.S. Cl.
CPC ............. *H04L 45/18* (2013.01); *H04L 45/28* (2013.01); *H04L 49/557* (2013.01)

(58) Field of Classification Search
CPC ........ H04L 45/18; H04L 45/28; H04L 49/557
See application file for complete search history.

(56) References Cited

U.S. PATENT DOCUMENTS

| | | | |
|---|---|---|---|
| 9,646,007 B2 * | 5/2017 | Pereira | G06F 17/30038 |
| 2002/0026645 A1 | 2/2002 | Son et al. | |
| 2005/0033794 A1 * | 2/2005 | Aridor | H04L 29/06 709/200 |
| 2009/0144390 A1 | 6/2009 | Previdi et al. | |
| 2010/0094878 A1 | 4/2010 | Soroca et al. | |
| 2016/0164761 A1 * | 6/2016 | Sathyanarayana | H04L 65/60 709/219 |
| 2016/0337426 A1 | 11/2016 | Shribman et al. | |
| 2017/0279916 A1 * | 9/2017 | Kovacs | H04L 67/2842 |

* cited by examiner

*Primary Examiner* — Duc C Ho
(74) *Attorney, Agent, or Firm* — Los Angeles Patent Group; Arman Katiraei (57) ABSTRACT

Some embodiments provide loop detection and loop prevention mechanisms for messaging passing in between peers in a multi-tier hierarchy. In some embodiments, the messaging header is modified to track which peers have received a copy of the message. Each peer appends its identifier to the message header before passing the message to another peer. When selecting a receiving peer, the sending peer ensures that the receiving peer is not already identified in the message header. If the receiving peer has already received the message, then another peer from a next-peer list is selected to receive the message. If all peers in the next-peer have been traversed, the sending peer returns an error message via a reverse traversal of the peers in the message header.

20 Claims, 7 Drawing Sheets

NETWORK FAILOVER AND LOOP DETECTION IN HIERARCHICAL NETWORKS

CLAIM OF BENEFIT TO RELATED APPLICATIONS

This application is a continuation of U.S. non-provisional application Ser. No. 14/860,287, entitled "Network Failover and Loop Detection in Hierarchical Networks", filed Sep. 21, 2015. The contents of application Ser. No. 14/860,287 are hereby incorporated by reference.

BACKGROUND ART

Caching hierarchies are commonly used to accelerate the delivery of content to end users. A caching hierarchy includes different tiers with one or more peers per tier. Each peer represents one or more servers that are deployed to different network locations. In a caching hierarchy, the peers store copies of the same content at each of the different locations in order to serve the content to end users from the location that is most proximate to the end user.

The caching hierarchy tiers allow for a fan-out distribution of the content. Requests for content that is not cached at a first tier funnels through to different tiers until reaching a final tier where only a limited number of peers have access to an origin site where an original copy of the content is stored.

Most content delivery networks (CDNs) operate using some tiered caching hierarchy. A CDN operates multiple points-of-presence (PoPs) with each PoP representing a set of caching servers operating from or serving content to a specific geographic region. The PoPs, and by extension the servers of each PoP, function as peers that can be configured to different hierarchical caching tiers for different customer content. For example, the CDN may have PoPs in Los Angeles, Dallas, New York, and Florida. A first customer origin server may be located somewhere in California. Accordingly, the CDN could designate the Dallas, New York, and Florida PoPs to a first caching tier and the Los Angeles PoP to a second caching tier. When a request for the first customer content is received at a first caching tier PoP and the content is not cached therein, the first caching tier PoP does not access the first customer origin directly to retrieve the content, but rather the Los Angeles PoP as the second caching tier. When the Los Angeles PoP also does not have a cached copy of the first customer content, the Los Angeles PoP retrieves the content from the first customer origin and distributes the content to the first tier PoP for distribution to the requesting end user. If a second customer origin server was located somewhere in Texas, the CDN would designate the Los Angeles, New York, and Florida PoPs as first tier PoPs and the Dallas PoP as the second tier PoP for the second customer content. From these two examples, it should be evident that designation of nodes to tiers can change depending on which customer's content is requested.

Each of the peers can be configured with one or more next-tier lists. The next-tier list identifies the next lower tier within the multi-tier hierarchy that a peer should access in order to retrieve requested content of a particular customer that is not present in cache. Continuing from the example above, the next-tier list for the New York PoP would identify the Los Angeles PoP as the next PoP to access when the first customer content is requested and not present in cache. The next-tier list would change to identify the Dallas PoP as the next PoP to access when the second customer content is requested and not present in cache.

Any tier within a multi-tier hierarchy can have multiple peers. The multiple peers at a given tier can be used to facilitate failover. For instance, a failure may prevent a first peer at a first tier from accessing a configured next-tier peer at a second tier. Failover allows the first peer at the first tier to pass the request to a different second peer at the first tier so that the second peer can attempt to access the next-tier peer at the second tier on behalf of the first peer. The second peer may be located in a different geographic region than the first peer. As a result, the second peer may have different functioning network pathways or better performing network pathways to connect to the peer at the second tier.

To enable such failover, the various peers are configured with a same-tier list in addition to the above mentioned next-tier list. The same-tier list identifies other peers in the same tier to failover to when a particular peer is unable to access a peer at a lower tier identified in its next-tier list.

Figure 1:
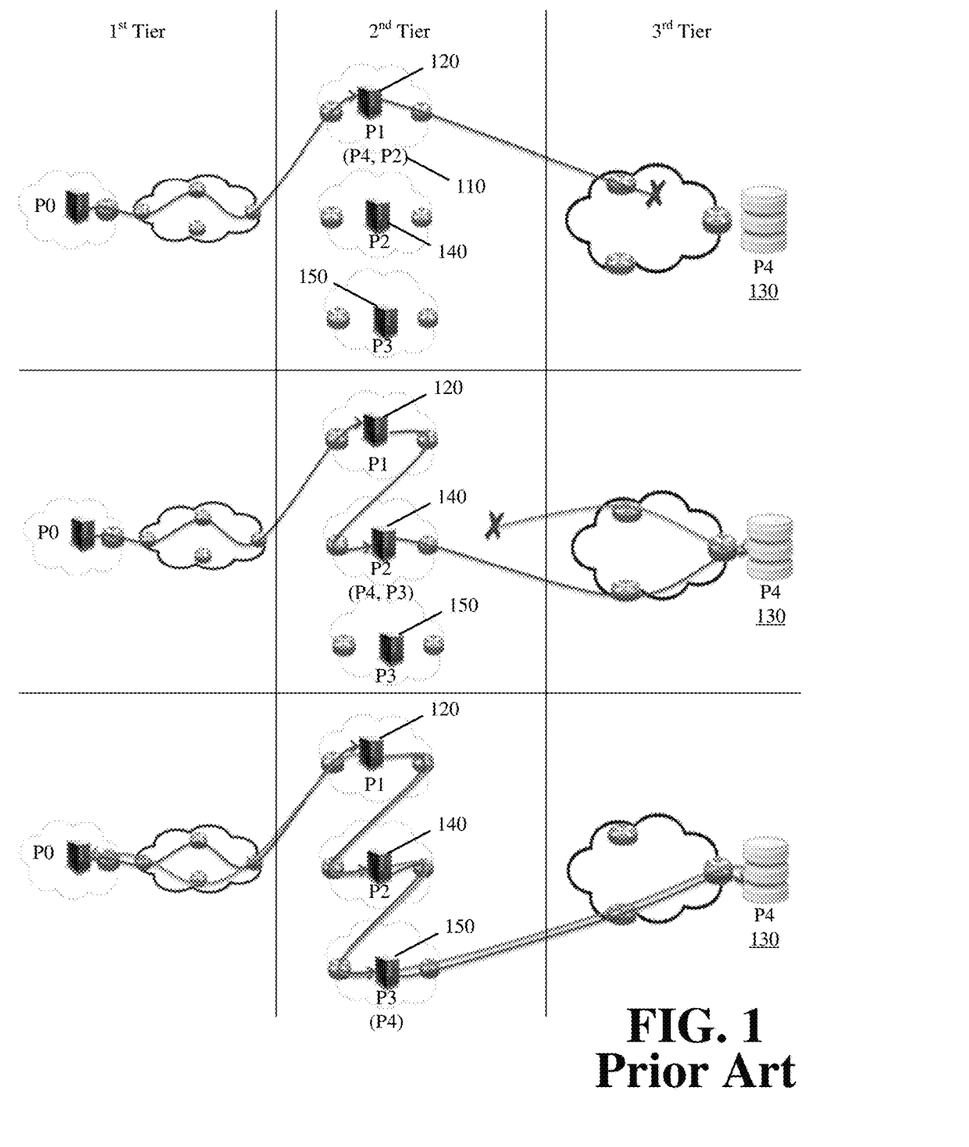
FIG. 1 illustrates peers at a particular tier performing failover.

FIG. 1 illustrates peers at a particular tier performing failover. For simplicity, the next-tier and the same-tier lists are combined into one next-peer list (e.g., reference marker 110). The first peer identified in the combined next-peer list identifies the lower tier peer that is accessed when requested content is not present in local cache of a particular peer. The subsequent peers identified in the next-peer list identify other peers in the same tier as the particular peer that the particular peer fails over to when the particular peer is unable to access the lower tier peer.

As shown in FIG. 1, peer 120 is unable to access the lower level tier 130. According to the next-peer list, the peer 120 fails over to peer 140. Peer 140 is also unable to access the lower level tier 130. Based on the next-peer list configured to peer 140, peer 140 fails over to peer 150 which successfully accesses the lower level tier 130 and retrieves the requested content. The requested content is then passed back through the multi-tier hierarchy for distribution back to the requesting user.

Figure 2:
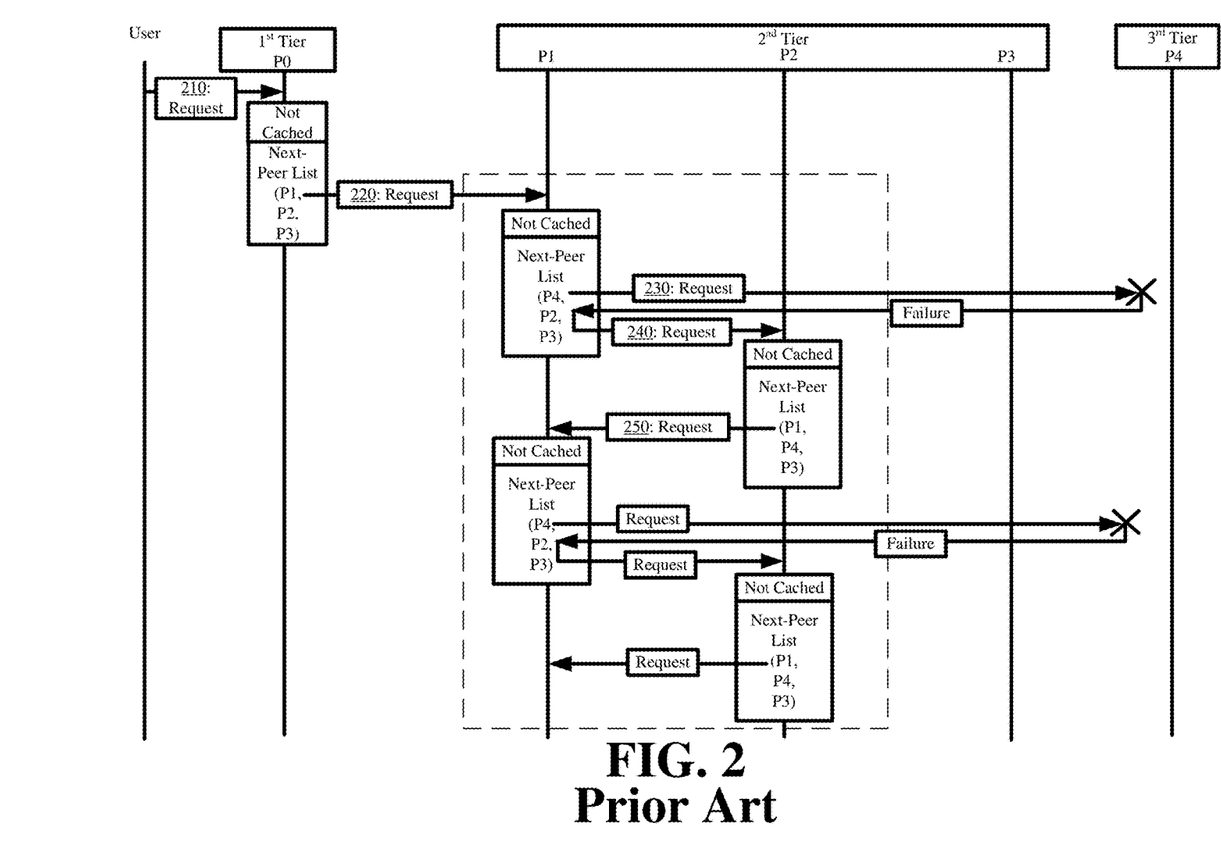
FIG. 2 conceptually illustrates an infinite loop forming within a particular tier of a caching hierarchy performing failover by way of the configured next-peer lists.

The primary shortcoming to failover based on next-peer lists is the potential for creating an infinite loop when the next-peer lists of different peers point to one another. FIG. 2 conceptually illustrates an infinite loop forming within a particular tier of a caching hierarchy performing failover by way of the configured next-peer lists.

FIG. 2 presents a three-tier caching hierarchy. Three second tier peers are configured with next-peer lists to facilitate failover if needed. A first tier peer receives (at 210) a user request. The first tier peer does not have requested content cached or the content is not cacheable and needs to be retrieved from a next tier. Accordingly, the first tier peer passes (at 220) the request to the first second tier peer. The first second tier peer also does not have the requested content cached. The first second tier peer attempts (at 230) to retrieve the content from the third tier peer, but a failure prevents the first second tier peer from doing so. The first second tier peer then performs failover according to its next-peer list and forwards (at 240) the request to a second peer at the second tier.

The second peer also does not have the content cached. According to its configured next-peer list, the second peer passes the (at 250) the request back to the first peer. The request then continually passes back-and-forth between the first peer and the second peer at the caching hierarchy second tier.

There is therefore a need for loop detection and loop prevention when passing messaging across a hierarchy of different peers organized to different tiers. More specifically, there is a need to implement failover in a manner that does not create loops within a caching hierarchy or other hierarchy comprised of multiple tiers and multiple peers in some of the tiers. To this end, there is a need to elastically find an alternate route to a second tier peer when a first tier peer is unable to access the second tier peer.

BRIEF DESCRIPTION OF THE DRAWINGS

A preferred embodiment of methods and systems for elastic route loop detection and loop prevention will now be described, by way of example only, with reference to the accompanying drawings in which.

DETAILED DESCRIPTION

Some embodiments provide elastic routing for loop detection and loop prevention within a multi-tier hierarchy. The elastic routing allows peers at a first hierarchical tier to find a route to a peer at a second hierarchical tier by performing a non-circular traversal of the peers at the first tier until one is found that can access the peer at the second hierarchical tier or a sufficient number of accesses have been made from different first tier peers to determine that the peer at the second hierarchical tier is inaccessible. In doing so, elastic routing compliments and enhances failover implemented within the multi-tiered hierarchy by critically eliminating the potential for an infinite loop from forming irrespective of whether two peers at the same tier or different tiers identify one another as a next peer.

Figure 3:
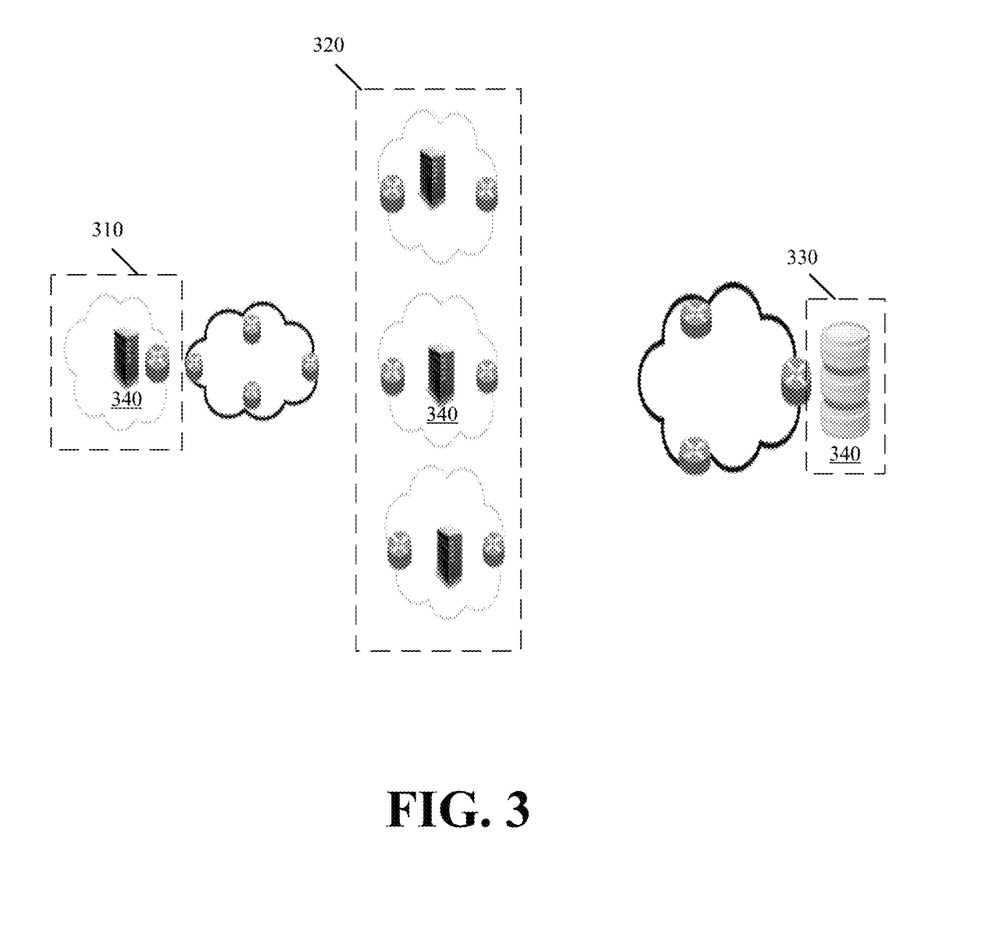
FIG. 3 conceptually illustrates a multi-tier hierarchy in accordance with some embodiments.

FIG. 3 conceptually illustrates a multi-tier hierarchy in accordance with some embodiments. The hierarchy includes three tiers 310, 320, and 330 with each tier including one or more peers (e.g., 340). A peer is a server or any machine that communicates with other peers in the same or different tiers.

In the context of a caching hierarchy, the peers represent different caching servers providing a distributed caching infrastructure for accelerating content delivery to end users. For instance, user requests for content received at any first tier peer that is not cached by the first tier peer or is not cacheable funnels to a peer in the second tier. If the content is not cached at the second tier peer, the request again funnels through to the third caching tier which can serve as the gateway to an origin site for the requested content. In other words, only servers or peers in the third caching tier can access to the origin site. In this caching hierarchy, the origin site only distributes the content to the third tier peers.

The third tier peers then fan out the content by distributing to the second tier peers which further fan out the content to the first tier peers. The first tier peers ultimately pass the content to any requesting end users. End user requests can also be directly received by peers in the second or third tiers such that traversal of some tiers may be avoided depending on the location of the end users. Also the designation of a peer to any of the tiers can change depending on the content being requested. In some embodiments, different peers act as the gateway to different content origin sites.

A content delivery network (CDN) provides such a multi-tiered caching hierarchy. In the context of the CDN, the peers represent different caching servers. The caching servers are deployed to different geographic regions or different points-of-presence (PoPs) that operate in different geographic regions with each PoP being formed from a set of caching servers working collectively to service a particular geographic region. The multi-tier hierarchy of FIG. 3 can also represent any cloud platform, hosting platform, or other distributed platform with a hierarchically organization and operation of servers.

The provided embodiments implement elastic routing to provide loop detection and loop prevention in any such multi-tier hierarchy or hierarchical architecture. The elastic routing implementation of some embodiments involves utilizing a specialized peer-to-peer message header and modifying peer operation to leverage the peer-to-peer message header for loop detection and loop prevention.

In some embodiments, elastic routing compliments and enhances failover operation of any peer. In performing failover, the particular peer is configured to use one or more other peers in the same hierarchical tier to access a lower tier peer on behalf of the particular peer when some failure prevents the particular peer from accessing the lower tier directly. In some embodiments, the failure can result from a downed link or poor performance in the network pathway connecting the particular peer to the lower tier node. In some embodiments, a failure is identified when a peer receives Hypertext Transfer Protocol (HTTP) 404, 504, or other response/error codes when attempting to access a lower tier peer.

In some embodiments, the elastic routing peer-to-peer message header tracks which peers have already received a message. The peer-to-peer message header can be a newly added header or a repurposed header within messaging passing between peers. Some embodiments use the HTTP "via:" header to track which peers have already received the message. In some such embodiments, the via header is populated with tags that identify the peers having previously received the message. Some embodiments use the "Forwarded:" HTTP header defined in Request for Comment 7239 or the "X-Forwarded-For:" HTTP header field to track Internet Protocol (IP) addresses or other addressing identifying which peers have already received the message.

As part of the elastic routing modified peer operation, whenever a first peer passes a message to a second peer, the first peer appends an identifier identifying itself in the peer-to-peer message header. The identifier can be any of a unique tag identifying the first peer, IP address, name, or other unique identifier. As the message passes between different peers, the appended list of identifiers identifying a list of traversed peers grows.

Elastic routing then involves modifying peer operation to use the tracked entries in the peer-to-peer message header to alter selection of a next peer and prevent the formation of loops. The elastic routing modified peer operation therefore operates in conjunction with next-peer lists configured on one or more peers. The next-peer list of a particular peer may identify a lower tier peer or one or more other peers in the same hierarchical tier as the particular peer for the particular peer to use in accessing a lower tier peer when the particular peer is itself unable to access the lower tier peer. The next-peer list defines the order in which the particular peer uses other peers in the same hierarchical tier to access the lower tier node on its behalf. The ordering can change depending on the content or request at issue, wherein different content can designate different peers as the gateway peer for accessing a content provider origin site. According to elastic routing modified peer operation, when an identifier for a peer selected from the next-peer list is present in the peer-to-peer message header, the selected peer is discarded and a next peer is selected from the next-peer list. Specifically, the presence of the selected peer identifier in the peer-to-peer message header identifies that the selected peer has already received the message and returning the message to that peer only creates a loop in the hierarchy.

Figure 4:
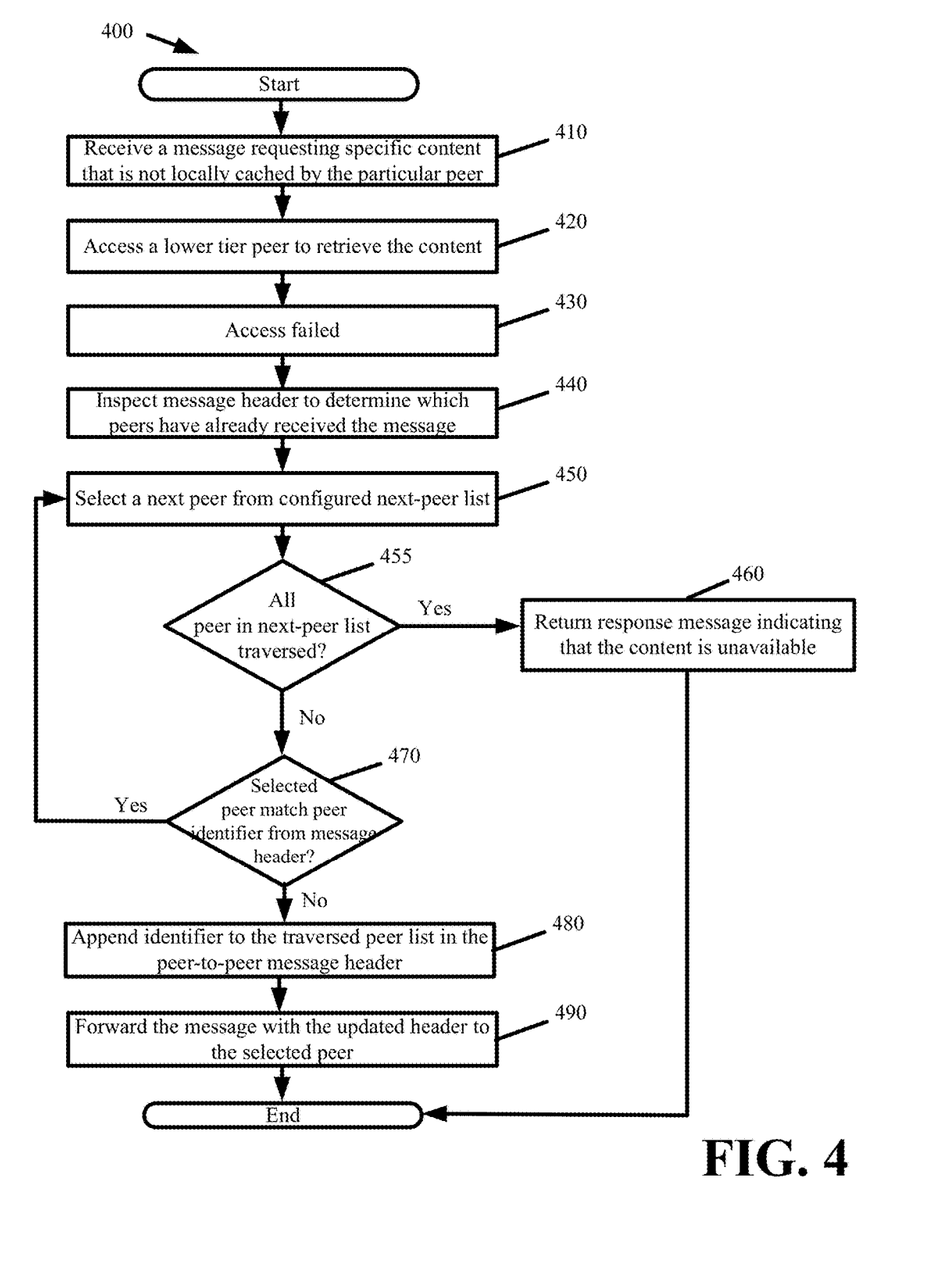
FIG. 4 presents a process describing modified operation of a particular peer implementing elastic routing loop detection and loop prevention in accordance with some embodiments.

FIG. 4 presents a process 400 describing modified operation of a particular peer implementing elastic routing loop detection and loop prevention in accordance with some embodiments. The process 400 commences when the particular peer receives (at 410) a message requesting specific content that is not locally cached by the particular peer. The process 400 attempts (at 420) to access a lower tier peer to retrieve the content. The lower tier peer can be identified as the first entry in the particular peer's configured next-peer list. A failure (at 430) prevents successful retrieval of the content from the lower tier peer. Steps 420 and 430 may be omitted or performed later when the lower tier peer is not the first entry in the next-peer list.

The process 400 then inspects the message to determine (at 440) which peers have already received the message. Specifically, the process extracts and processes the peer identifiers that have been appended to the peer-to-peer message header. The process then selects (at 450) a next peer from its configured next-peer list.

As part of the selection at step 450, the process determines (at 455) if all peers in the next-peer list have already been traversed. When all peers in the next-peer list have been traversed, the process returns (at 460) a response message (e.g., HTTP 504 message) indicating that the content is unavailable. The response message is returned to the last peer identified in the peer-to-peer message header (i.e., the server from which the current server received the message). The response message can also include the peer identifiers from the peer-to-peer message header so that the receiving peer can return the response message through a reverse traversal of the peers.

When the next-peer list has not been exhausted, the process determines (at 470) whether the selected peer matches a peer identifier from the peer-to-peer message header. If so, loop detection identifies the selected peer as one that has previously received the message. Elastic routing loop prevention then causes the process to revert back to step 450 and select the next peer from its configured next-peer list. If the selected peer does not match any peer identifiers from the peer-to-peer message header, the process appends (at 480) its identifier to the traversed peer list in the peer-to-peer message header and forwards (at 490) the message with the updated header to the selected peer.

Figure 5:
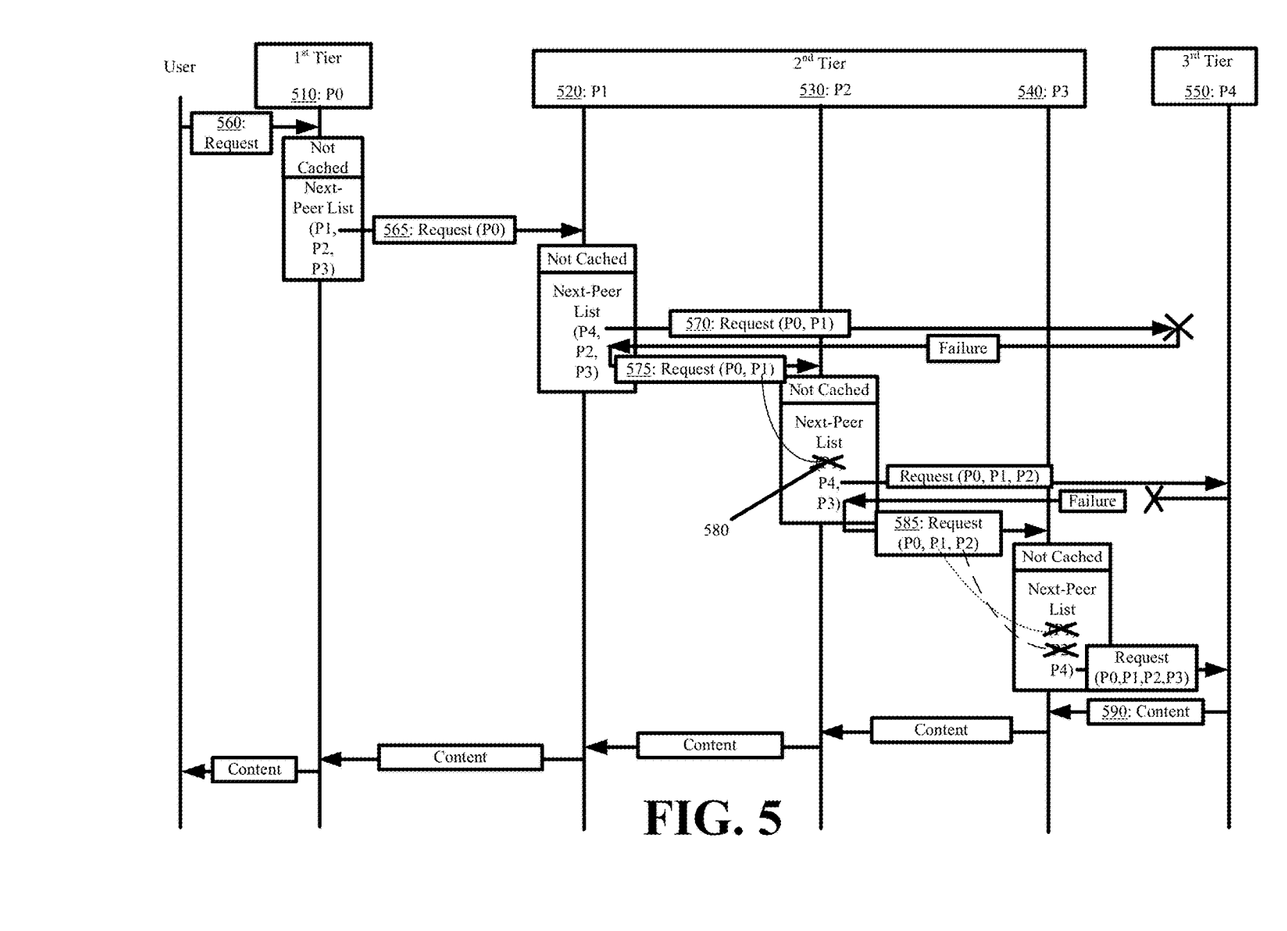
FIG. 5 conceptually illustrates preventing loop formation based on the elastic routing peer-to-peer message header and modified peer behavior of some embodiments.

FIG. 5 conceptually illustrates preventing loop formation based on the elastic routing peer-to-peer message header and modified peer behavior of some embodiments. The figure illustrates a first hierarchical tier with a first peer 510, a second hierarchical tier with a second peer 520, a third peer 530, and a fourth peer 540, and a third hierarchical tier with a fifth peer 550.

The first peer 510 receives (at 560) a user request for content. The first peer 510 does not have a copy of the requested content in cache or the content is not cacheable. The first peer 510 therefore cannot fulfill the request. The first peer 510 queries its next-peer list. The first entry in the first peer 510 next-peer list identifies the second server 520 at the second lower tier as a next peer to receive the request. The first peer 510 appends its identifier to the traversed peer list in the request message header and forwards (at 565) the message with the updated header to the second peer 520. There is no failure in this exchange and so the first peer 510 has relinquished control over the message to the second peer 520.

The second peer 520 also does not have a copy of the requested content in cache. The second peer 520 next-peer list first identifies the fifth peer 550 as the next lower tier peer from which to retrieve a copy of the requested content. The second peer 520 appends its identifier to the message and attempts (at 570) to access the fifth peer 550 to retrieve the content. However, the second peer 520 is unable to access the fifth peer 550 as a result of some failure. The second peer 520 then queries its next-peer server list to select a next peer to receive the request.

The next identified peer in the configured next-peer list of the second peer 520 is the third peer 530 at the same second hierarchical tier as the second peer 520. Accordingly, the second peer 520 passes (at 575) the message with peer-to-peer message header identifying previous traversals of the first peer 510 and now the second peer 520.

The third peer 530 also does not have a copy of the requested content in cache. The first entry in the third peer 530 next-peer list identifies the second peer 520. However, the second peer 520 identifier is present in the peer-to-peer message header. The presence of the second peer 520 identifier in the message header indicates that the second peer 520 has already received the request and suffered some failure of its own. Without elastic routing loop detection and loop prevention, the second peer 520 and the third peer 530 could repeatedly send the request to each other. However, the third peer 530 discards (at 580) the second peer 520 selection because of the modified peer operation implemented by the elastic routing loop detection and loop prevention of some embodiments.

The third peer 530 queries its next-peer list again and this time identifies the fifth peer 550 as the lower tier peer from which to retrieve a copy of the requested content. The third peer 530 appends its identifier to the peer-to-peer message header before attempting to pass the message to the fifth peer 550. Again, the attempt to access the fifth peer 550 fails.

The third peer 530 then implements failover and again selects the next peer from the next-peer list. This third selection identifies the fourth peer 540 as the next peer in the same second hierarchical tier as the third peer 530. As the fourth peer 540 is not identified in the peer-to-peer message header, the third peer 530 forwards (at 585) to the fourth peer 540, the message with the peer-to-peer message header now identifying the first peer 510, the second peer 520, and the third peer 530.

The fourth peer 540 also does not have the requested content cached. The peer-to-peer message header and elastic routing implementation prevents the fourth peer 540 from passing the request back to either the second peer 520 or the third peer 530. According to the next-peer list configured on the fourth peer 540, the fourth peer 540 attempts and is successful in retrieving (at 590) the content from the fifth peer 550.

A reverse traversal of the peers is then made based on the identifiers in the peer-to-peer message header. The fourth peer 540 returns the content to the third peer 530 which then forwards the content to the second peer 520. The second peer 520 returns the content to the first peer 510. The first peer 510 then returns the content to the requesting user. Each traversed peer may cache a copy of the content during the reverse traversal.

Elastic routing can also be used to trigger different peer behavior when the list of traversed peers grows to a certain length or number of identifiers. In some embodiments, elastic routing configurably limits the number of traversed peers based on the number of identifiers appended to the traversed peer list in the peer-to-peer message header. When the peer-to-peer message header reaches a certain length or maximum number of identifiers (i.e., number of servers traversed), the peer processing the message either returns a copy of the requested content from cache or returns a response message that the content is not accessible. In other words, the peer does not continue going through its next-peer list even if one or more entries exist that have not yet been accessed. For example, the peers can be configured to stop accessing the next peer after the traversed peer list includes three peer identifiers.

Figure 6:
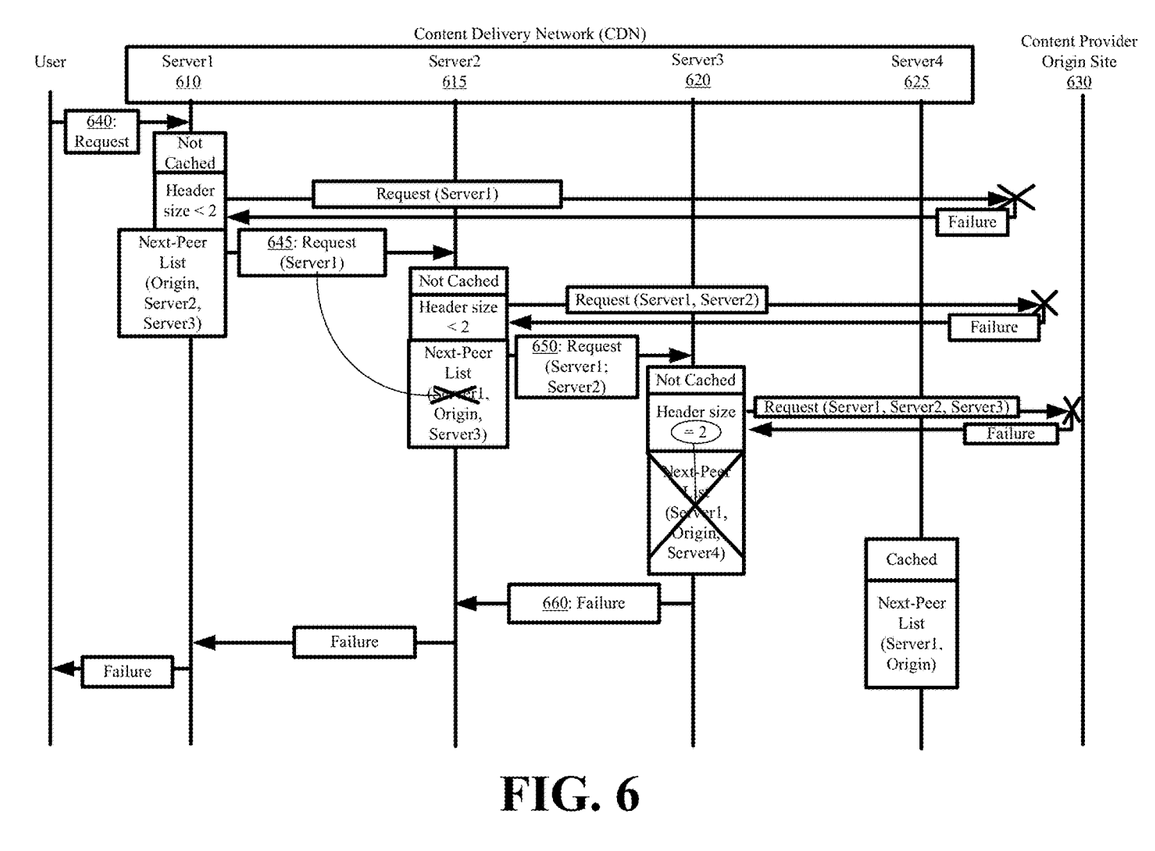
FIG. 6 illustrates limiting the number of peer accesses based on the number of peer identifiers in the peer-to-peer message header in accordance with elastic routing of some embodiments.

FIG. 6 illustrates limiting the number of peer accesses based on the number of peer identifiers in the peer-to-peer message header in accordance with elastic routing of some embodiments. The figure illustrates four peers 610, 615, 620, and 625 in a common tier with access to an origin site 630. Due to various failures, the first peer 610, the second peer 615, and the third peer 620 are unable to access the origin site 630. The fourth peer 625 is the only peer of the four with access to the origin site 630 or having a cached copy of the requested content.

In this figure, the peers 610, 615, 620, and 625 are configured to perform at most three peer accesses before returning a response. The access limit is therefore reached when the peer-to-peer message header includes two peer identifiers and the third peer receiving the message with two entries in the peer-to-peer message header is unable to obtain the requested content.

The first peer 610 receives (at 640) a user request for content provider content. The first peer 610 does not have the requested content cached and cannot fulfill the request by accessing the origin site 630. Since the request message peer-to-peer header does not include any peer identifiers, the first peer 610 knows that it has made a first access to retrieve the content and that two additional accesses can be made. Accordingly, the first peer 610 sends (at 645) the request with the first peer 610 identifier appended to the message header on to the second peer 620 which is identified as the next peer in the first peer 610 next-peer list.

The second peer 615 does not have the requested content cached. Based on the first peer 610 identifier in the peer-to-peer message header, the second peer 615 identifies that it can make a second attempt to retrieve the requested content. The second peer 615 queries its next-peer list to identify a next peer not already identified in the peer-to-peer message header. The second peer 615 next-peer list identifies the first peer 610 as the next peer. The second peer 615 however knows that the first peer 610 has already made an access attempt as a result of the first peer 610 identifier being included in the message peer-to-peer header. Accordingly, the second peer 615 selects another peer from its next-peer list. The second selection selects the origin site 630. However, the second peer 615 is also unable to access the origin site 630. The second peer 615 then selects from the next-peer list again to select a peer to make a third attempt to retrieve the content. This time the second peer 615 selects the third peer 620. The third peer 620 has not yet made an access attempt. The second peer 615 passes (at 650) the message to the third peer 620, wherein the peer-to-peer message header now includes identifiers identifying the first peer 610 and the second peer 615.

The third peer 620 also does not have the requested content cached. Based on the two peer identifiers in the message header, the third peer 620 identifies that it can make a third and final attempt to retrieve the requested content. Based on the peer-to-peer message header and the next-peer list configured for the third peer 620, the third peer 620 avoids sending the request back to the first peer 610 or the second peer 615 and makes a third attempt to retrieve the content from the origin site 630. This attempt is also unsuccessful.

Rather than pass the message from the third peer 620 to the fourth peer 625 for a fourth attempt, the third peer 620 returns (at 660) a response back to the second peer 615. The response indicates that the content is unavailable. The second peer 615 forwards the response to the first peer 610 and ultimately to the requesting user.

Of course, at any time in the traversal, if a peer involved in the traversal obtains a copy of the requested content (e.g., from cache, another peer, or an origin site) prior to reaching the maximum number of traversed peers, then the traversal is stopped at that peer and the content is returned back via a reverse peer traversal. In other words, the maximum traversal of peers is only reached if no peers involved in the traversal are able to fulfill the request by providing a cached copy of the content or by retrieving a copy from an origin site.

Many of the above-described processes and components are implemented as software processes that are specified as a set of instructions recorded on a non-transitory computer-readable storage medium (also referred to as computer-readable medium). When these instructions are executed by one or more computational element(s) (such as processors or other computational elements like ASICs and FPGAs), they cause the computational element(s) to perform the actions indicated in the instructions. Server, computer, and computing machine are meant in their broadest sense, and can include any electronic device with a processor including cellular telephones, smartphones, portable digital assistants, tablet devices, laptops, notebooks, and desktop computers. Examples of computer-readable media include, but are not limited to, CD-ROMs, flash drives, RAM chips, hard drives, EPROMs, etc.

Figure 7:
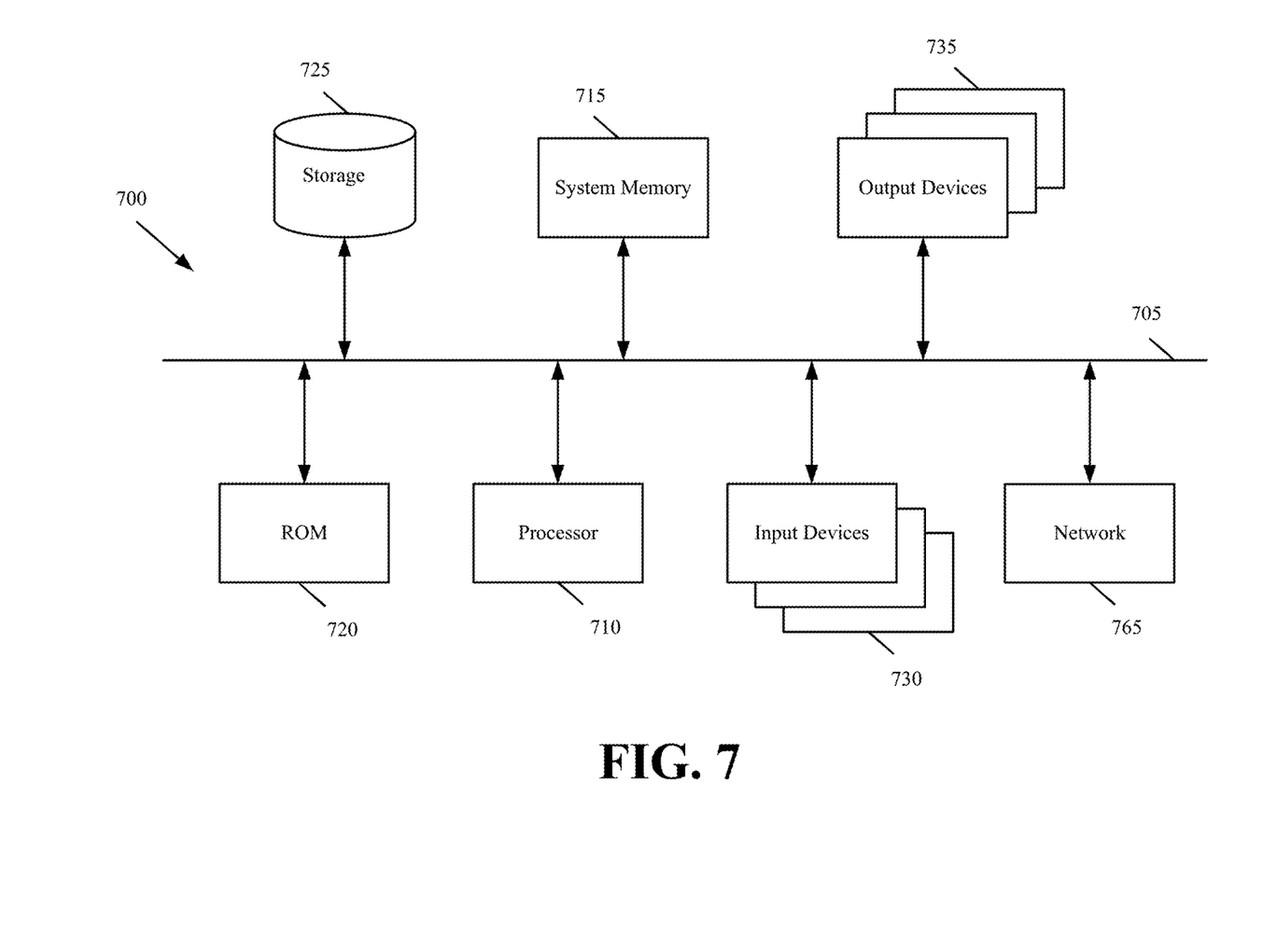
FIG. 7 illustrates a computer system or server with which some embodiments are implemented.

FIG. 7 illustrates a computer system or server with which some embodiments are implemented. Such a computer system includes various types of computer-readable mediums and interfaces for various other types of computer-readable mediums that implement the various methods and machines described above (e.g., peer, server, etc.). Computer system 700 includes a bus 705, a processor 710, a system memory 715, a read-only memory 720, a permanent storage device 725, input devices 730, and output devices 735.

The bus 705 collectively represents all system, peripheral, and chipset buses that communicatively connect the numerous internal devices of the computer system 700. For instance, the bus 705 communicatively connects the processor 710 with the read-only memory 720, the system memory 715, and the permanent storage device 725. From these various memory units, the processor 710 retrieves instructions to execute and data to process in order to execute the processes of the invention. The processor 710 is a processing device such as a central processing unit, integrated circuit, graphical processing unit, etc.

The read-only-memory (ROM) 720 stores static data and instructions that are needed by the processor 710 and other modules of the computer system. The permanent storage device 725, on the other hand, is a read-and-write memory device. This device is a non-volatile memory unit that stores instructions and data even when the computer system 700 is off. Some embodiments of the invention use a mass-storage device (such as a magnetic or optical disk and its corresponding disk drive) as the permanent storage device 725.

Other embodiments use a removable storage device (such as a flash drive) as the permanent storage device Like the permanent storage device 725, the system memory 715 is a read-and-write memory device. However, unlike storage device 725, the system memory is a volatile read-and-write memory, such as random access memory (RAM). The system memory stores some of the instructions and data that the processor needs at runtime. In some embodiments, the processes are stored in the system memory 715, the permanent storage device 725, and/or the read-only memory 720.

The bus 705 also connects to the input and output devices 730 and 735. The input devices enable the user to communicate information and select commands to the computer system. The input devices 730 include alphanumeric keypads (including physical keyboards and touchscreen keyboards), pointing devices. The input devices 730 also include audio input devices (e.g., microphones, MIDI musical instruments, etc.). The output devices 735 display images generated by the computer system. The output devices include printers and display devices, such as cathode ray tubes (CRT) or liquid crystal displays (LCD).

Finally, as shown in FIG. 7, bus 705 also couples computer 700 to a network 765 through a network adapter (not shown). In this manner, the computer can be a part of a network of computers (such as a local area network ("LAN"), a wide area network ("WAN"), or an Intranet, or a network of networks, such as the Internet).

As mentioned above, the computer system 700 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method comprising:
sending a message from a first server in a first tier of servers to a particular server in a second tier of servers over a first network path;
passing a modified message from the first server to a second server in the first tier of servers in response to (i) said sending failing or (ii) poor network performance affecting said sending; and
sending the modified message from the second server to the particular server in the second tier of servers over a different second network path.

2. The method of claim 1 further comprising receiving content from the particular server at the second server in response to said sending the modified message.

3. The method of claim 2 further comprising forwarding said content from the second server to the first server in response to passing the modified message.

4. The method of claim 1 further comprising inspecting a cache of the second server for content referenced in the modified message in response to said passing of the modified message to the second server.

5. The method of claim 4, wherein said sending the modified message is in response to said inspecting identifying that said content is not present in said cache of the second server.

6. The method of claim 5 further comprising returning said content from said cache of the second server without sending the modified message to the particular server in response to said inspecting identifying that said content is present in said cache and further in response to said passing of the modified message.

7. The method of claim 1 further comprising identifying said second server as a next peer of the first server from a configured peer list of the first tier of servers at the first server before said passing and in response to (i) said sending failing or (ii) said poor network performance.

8. The method of claim 1 further comprising detecting a failure or poor network performance in said sending of the modified message.

9. The method of claim 8 further comprising inspecting a configured peer list of the first tier of servers at the second server in response to said detecting.

10. The method of claim 9 further comprising passing from the second server to the first server, a response that said message cannot be completed in response to the configured peer list comprising one or more server identifiers matching to a first server identifier or any other server identifiers in a header of the modified message.

11. The method of claim 9 further comprising passing a second modified message from the second server to a third server in the first tier of servers in response to said inspecting identifying a third server identifier in the configured peer list as a next peer with an identifier not matching to a first server identifier or any other server identifiers in a header of the modified message, wherein the third server identifier identifies the third server, and wherein the second modified message comprises said message and a header with the first server identifier and a second server identifier.

12. A method comprising:
receiving a message from a first server in a first tier of servers at a second server in the first tier of servers, said message directed to a particular server in a second tier of servers;
sending said message from the second server to the particular server;
identifying at the second server, the first server as a next peer in a next peer list in response to (i) said sending failing or (ii) poor network performance affecting said sending, the next peer list comprising an ordering of other servers in the first tier of servers;

identifying at the second server, a third server in the first tier of servers as a peer after the first server in the next peer list in response to an identifier of the first server being included in a header of said message; and passing said message from the second server to the third server in response to an identifier of the third server not being included in the header of said message.

13. The method of claim 12, wherein passing said message comprises inserting an identifier of the second server in said header prior to said passing.

14. The method of claim 12 further comprising inspecting the header of the message at the second server and extracting at least the identifier of the first server based on said inspecting.

15. The method of claim 12, wherein the next peer list comprises the first server as a first designated peer for the second server and the third server as a second designated peer for the second server.

16. The method of claim 12, wherein said sending comprises sending the message over a network path to the particular server that is different than a network path connecting the first server to the particular server.

17. A method comprising:
sending a message from a first server in a first tier of servers to a destination;
passing said message from the first server to a second server in the first tier of servers in response to (i) said sending from the first server failing or (ii) poor network performance affecting said sending from the first server;
sending said message from the second server to the destination;
selecting by the second server, a third server in the first tier of servers to attempt sending said message to the destination in response (i) said sending from the second server failing or (ii) poor network performance affecting said sending from the second server, wherein said selecting comprises identifying by the second server, the first server as having previously attempted sending said message to the destination and the third server as not having previously attempted sending said message to the destination; and
passing said message from the second server to the third server in response to said selecting.

18. The method of claim 17, wherein said passing from the first server comprises inserting an identifier of the first server in a header of said message, and wherein said selecting comprises extracting by the second server, said identifier of the first server from said header.

19. The method of claim 18, wherein said passing from the second server comprises appending an identifier of the second server to the identifier of the first server in the header of said message.

20. The method of claim 17, wherein said sending of the message from the first server is over a first network path to the destination, and wherein said sending of the message from the second server is over a different second network path to the destination.

* * * * *